(12) United States Patent
Naka

(10) Patent No.: US 10,070,029 B2
(45) Date of Patent: Sep. 4, 2018

(54) LIGHT EMISSION CONTROL DEVICE INCLUDING ACCUMULATOR UNIT, METHOD OF CONTROLLING THE SAME, AND STORAGE MEDIUM, AS WELL AS IMAGE PICKUP APPARATUS

(71) Applicant: CANON KABUSHIKI KAISHA, Tokyo (JP)

(72) Inventor: Yasutaka Naka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 14/848,934

(22) Filed: Sep. 9, 2015

(65) Prior Publication Data
US 2016/0073026 A1 Mar. 10, 2016

(30) Foreign Application Priority Data

Sep. 10, 2014 (JP) .................................. 2014-184134

(51) Int. Cl.
*H04N 5/225* (2006.01)
*H04N 5/235* (2006.01)
(Continued)

(52) U.S. Cl.
CPC ........... *H04N 5/2256* (2013.01); *G03B 15/05* (2013.01); *H04N 5/2354* (2013.01);
(Continued)

(58) Field of Classification Search
CPC ............ H04N 5/2256; H04N 5/2354; H04N 5/23245; G03B 15/05; G03B 2215/0567; H05B 33/0845
(Continued)

(56) References Cited

U.S. PATENT DOCUMENTS

2005/0062877 A1* 3/2005 Yuyama ............... H04N 5/2256
348/371
2010/0285837 A1* 11/2010 Kalevo .................. G03B 15/03
455/556.1
(Continued)

FOREIGN PATENT DOCUMENTS

JP 08-062681 A 3/1996
JP 2000-358191 * 12/2000 ............. H04N 5/238
(Continued)

OTHER PUBLICATIONS

The above foreign patent documents were cited in the Mar. 6, 2018 Japanese Office Action, which is enclosed without an English Translation, that issued in Japanese Patent Application No. 2014184134.

*Primary Examiner* — Lin Ye
*Assistant Examiner* — Chan T Nguyen
(74) *Attorney, Agent, or Firm* — Cowan, Liebowitz & Latman, P.C.

(57) ABSTRACT

A light emission control device capable of preventing an increase in time required to shut down an image pickup apparatus when powering it off and preventing degradation of the durability of an accumulator unit. A light emission control device of a camera controls light emission of an LED that illuminates an object in photographing by supplying electric current from a capacitor. A charge controller controls the charge voltage of the capacitor to a first voltage threshold value for photographing. When the camera is shifted to a predetermined state except photographing, the charge controller controls the charge voltage to a second voltage threshold value which is lower than the first voltage threshold value by causing electric charges to be discharged from the capacitor.

12 Claims, 4 Drawing Sheets

(51) Int. Cl.
*G03B 15/05* (2006.01)
*H05B 33/08* (2006.01)
*H04N 5/232* (2006.01)

(52) U.S. Cl.
CPC . *H05B 33/0845* (2013.01); *G03B 2215/0567* (2013.01); *H04N 5/23245* (2013.01)

(58) Field of Classification Search
USPC .................................................. 348/207.1
See application file for complete search history.

(56) References Cited

U.S. PATENT DOCUMENTS

2011/0182569 A1* 7/2011 Momose ................ G03B 15/05
396/178
2016/0080643 A1* 3/2016 Kimura .............. H04N 5/23206
348/207.1

FOREIGN PATENT DOCUMENTS

| JP | 2000-358191 A | 12/2000 |
| JP | 2003-283924 A | 10/2003 |
| JP | 2014-035366 A | 2/2014 |

* cited by examiner

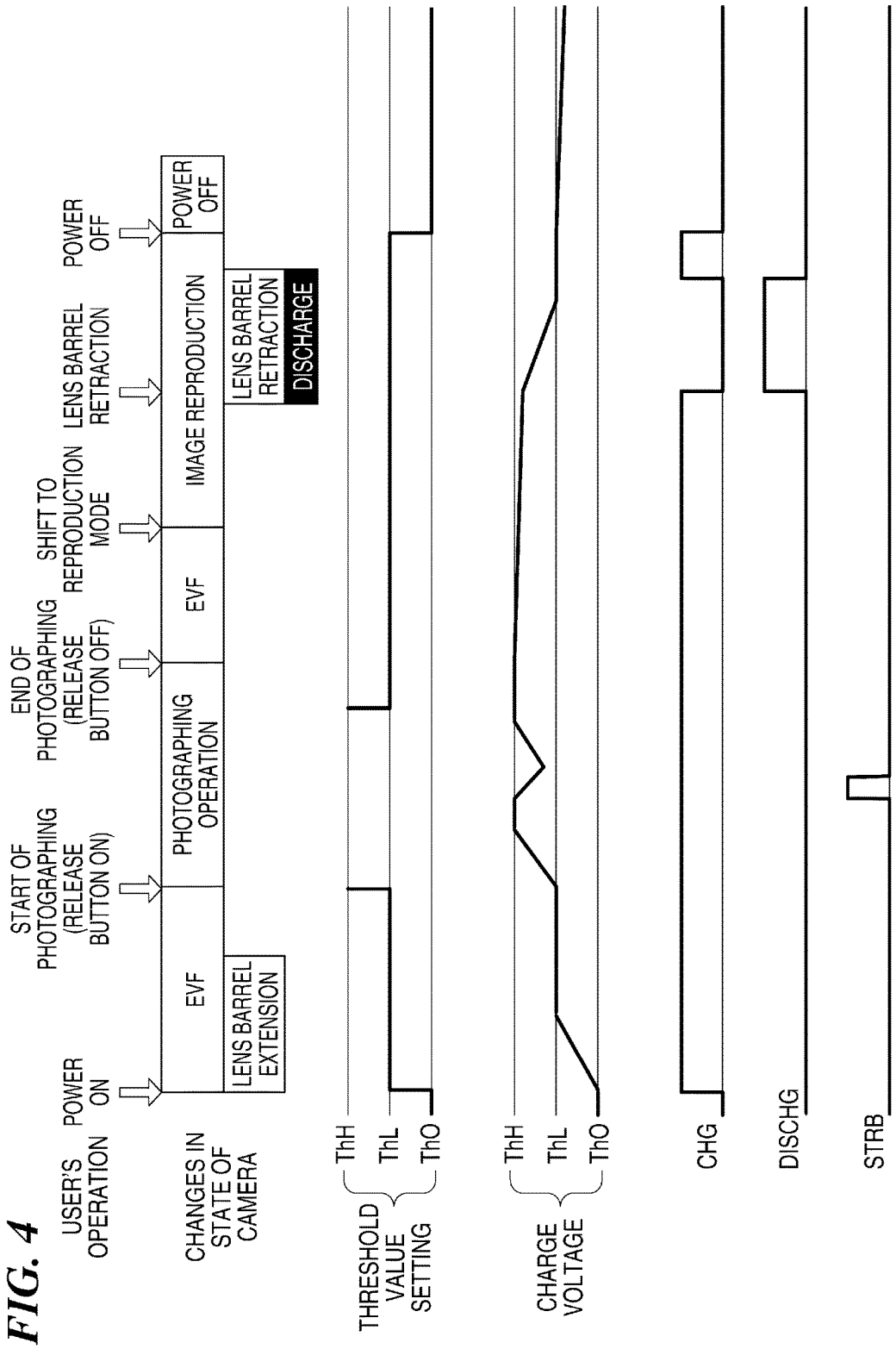

LIGHT EMISSION CONTROL DEVICE INCLUDING ACCUMULATOR UNIT, METHOD OF CONTROLLING THE SAME, AND STORAGE MEDIUM, AS WELL AS IMAGE PICKUP APPARATUS

BACKGROUND OF THE INVENTION

Field of the Invention

The present invention relates to a light emission control device including an accumulator unit, a method of controlling the same, and a storage medium, as well as an image pickup apparatus, and more particularly to charge/discharge control for a light emitting device used in an image pickup apparatus, such as a digital camera.

Description of the Related Art

In general, in a light emitting device (hereinafter referred to as the strobe device) used in an image pickup apparatus, such as a digital camera, a xenon tube is used as a light source (light emitting section). On the other hand, in the strobe device using the xenon tube, the xenon tube and a capacitor used for charge and discharge are large in volume. Further, to cause the xenon tube to emit light, it is necessary to generate high voltage of several kV as a trigger voltage. When taking this as well into consideration, it is difficult to achieve size reduction of the strobe device.

To solve this problem, there has been proposed a strobe device that uses, as a light source, a light emitting diode (LED) which is a high-luminance semiconductor light emitting device. The strobe device using the LED can be reduced in thickness and size by using an electric double layer capacitor (EDLC) having high volumetric efficiency.

Incidentally, in the strobe device, charge level control is performed by taking power efficiency and operability into account. For example, there has been proposed a strobe charge control method in which a main capacitor is charged with a large current up to a charge level at which the strobe device is capable of emitting light, and when the operation mode is changed to a photographing mode, the main capacitor is subjected to supplemental charging with a constant small current so as to make up for self-discharge (see Japanese Patent Laid-Open Publication No. 2000-358191).

Incidentally, in the strobe device using the electric double layer capacitor, if the strobe device is driven at a high voltage for a long time period, the lifetime of the electric double layer capacitor is reduced. In view of this, charge control is performed such that the charge voltage is increased to a voltage required to perform flash light emission only when performing photographing, and when the power is turned off, by taking the lifetime of the capacitor the voltage into consideration, the charge voltage is reduced to a predetermined voltage (predetermined level) or lower.

However, in a case where the electric double layer capacitor is discharged to the predetermined level whenever photographing is terminated, when repeatedly performing photographing, the charging time required to perform flash light emission becomes longer, which degrades the operability. Further, since the capacitor is discharged to the predetermined level, electric power which has been once charged is wasted. Furthermore, when the operability and the power efficiency of the image pickup apparatus (i.e. the strobe device) are considered, it is preferable not to proactively perform the discharge control for a time period during which there is a high possibility that the user performs photographing.

On the other hand, when the power is turned off, it is preferable to lower the voltage of the electric double layer capacitor to the predetermined level or lower by taking the durability of the electric double layer capacitor into consideration. However, if the voltage during operation is increased by taking the operability and the power efficiency into consideration, it takes a lot of time to complete discharge processing when the power is turned off, which results in an increase in time before the image pickup apparatus is shut down.

SUMMARY OF THE INVENTION

The present invention provides a light emission control device that is capable of preventing an increase in time required to shut down an image pickup apparatus when the image pickup apparatus is powered off, and also preventing degradation of the durability of an accumulator unit, a method of controlling the same, and a storage medium, as well as an image pickup apparatus.

In a first aspect of the invention, there is provided a light emission control device that selectively controls light emission of a light emitting section when photographing, comprising an accumulator unit configured to accumulate electric charges so as to supply electric current to the light emitting section, a charge control unit configured to perform charge control for controlling a charge voltage of the accumulator unit to a first voltage threshold value for causing the light emitting section to emit light, a light emission control unit configured to control light emission of the light emitting section in photographing, by supplying electric current from the accumulator unit of which the charge voltage is controlled to the first voltage threshold value, to the light emitting section, and a discharge control unit configured to control, when shifting the light emitting section to a predetermined state except the photographing, the charge voltage to a second voltage threshold value which is lower than the first voltage threshold value, by causing electric charges to be discharged from the accumulator unit.

In a second aspect of the invention, there is provided an image pickup apparatus comprising a light emission control device that selectively controls light emission of a light emitting section when photographing, including an accumulator unit configured to accumulate electric charges so as to supply electric current to the light emitting section, a charge control unit configured to perform charge control for controlling a charge voltage of the accumulator unit to a first voltage threshold value for causing the light emitting section to emit light, a light emission control unit configured to control light emission of the light emitting section in photographing, by supplying electric current from the accumulator unit of which the charge voltage is controlled to the first voltage threshold value, to the light emitting section, and a discharge control unit configured to control, when shifting the light emitting section to a predetermined state except the photographing, the charge voltage to a second voltage threshold value which is lower than the first voltage threshold value, by causing electric charges to be discharged from the accumulator unit, and an image pickup unit configured to obtain image data by photographing an object.

In a third aspect of the invention, there is provided a method of controlling a light emission control device including a light emitting section that illuminates an object, and an accumulator unit configured to accumulate electric charges so as to supply electric current to the light emitting section, the light emission control device selectively controlling light emission of the light emitting section when photographing, the method comprising performing charge control for controlling a charge voltage of the accumulator unit to a first voltage threshold value for causing the light emitting section to emit light, controlling light emission of the light emitting section in photographing, by supplying electric current from the accumulator unit of which the charge voltage is controlled to the first voltage threshold value, to the light emitting section, and controlling, when shifting the light emitting section to a predetermined state except the photographing, the charge voltage to a second voltage threshold value which is lower than the first voltage threshold value, by causing electric charges to be discharged from the accumulator unit.

In a fourth aspect of the invention, there is provided a non-transitory computer-readable storage medium storing a computer-executable program for executing a method of controlling a light emission control device including a light emitting section that illuminates an object, and an accumulator unit configured to accumulate electric charges so as to supply electric current to the light emitting section, the light emission control device selectively controlling light emission of the light emitting section when photographing, wherein the method comprises performing charge control for controlling a charge voltage of the accumulator unit to a first voltage threshold value for causing the light emitting section to emit light, controlling light emission of the light emitting section in photographing, by supplying electric current from the accumulator unit of which the charge voltage is controlled to the first voltage threshold value, to the light emitting section, and controlling, when shifting the light emitting section to a predetermined state except the photographing, the charge voltage to a second voltage threshold value which is lower than the first voltage threshold value, by causing electric charges to be discharged from the accumulator unit.

According to the present invention, when the image pickup apparatus is shifted to a predetermined state other than a photographing state, the charge voltage is controlled to the second voltage threshold value which is lower than the first voltage threshold value, by causing electric charges to be discharged from the accumulator unit. This makes it possible to prevent an increase in time required to shut down the image pickup apparatus when the image pickup apparatus is powered off, and also prevent degradation of the durability of the accumulator unit from.

Further features of the present invention will become apparent from the following description of exemplary embodiments (with reference to the attached drawings).

BRIEF DESCRIPTION OF THE DRAWINGS

FIG. 4 is a timing diagram useful in explaining charge/discharge control performed by the digital camera shown in FIG. 1.

DESCRIPTION OF THE EMBODIMENTS

The present invention will now be described in detail below with reference to the accompanying drawings showing embodiments thereof.

Figure 1:
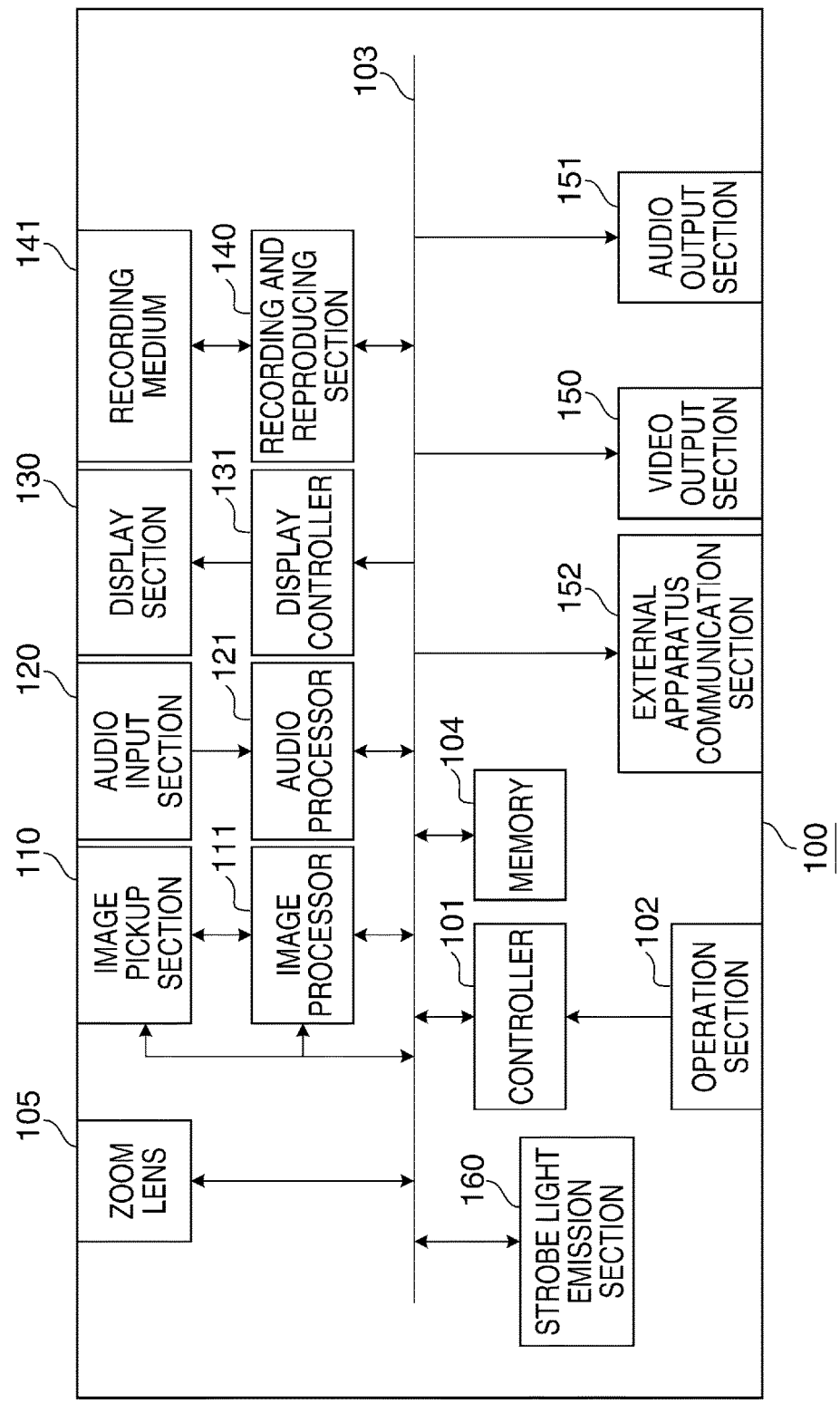
FIG. 1 is a schematic block diagram of a digital camera as an image pickup apparatus equipped with a light emission control device according to an embodiment of the present invention.

FIG. 1 is a schematic block diagram of an image pickup apparatus equipped with a light emission control device according to an embodiment of the present invention.

The image pickup apparatus shown in FIG. 1 is e.g. a digital camera (hereinafter simply referred to as the camera) 100, and includes a controller 101. The controller 101 includes a CPU (or MPU), a memory (DRAM or SRAM), and so forth, and controls the overall operation of the camera 100 by performing various processes (programs).

Further, the controller 101 controls the camera 100 according to a user's operation using an operation section 102. Further, the controller 101 analyzes image data obtained by an image processor 111, described hereinafter, and controls the camera 100 according to the analysis result.

The operation section 102 includes switches (buttons) for performing operations associated with photographing, such as a power button, a still image-recording button, a moving image-recording start button, a moving image-recording end button, a zoom adjustment button, a mode changing switch, and an auto focus button (none of which are shown).

Further, the operation section 102 includes a moving image jump button, a recording review continuation button, an enter button, other cursor keys, a pointing device, a touch panel, and so forth (none of which are shown). When one of these keys and buttons is operated, the operation section 102 sends an operation signal corresponding to the operation to the controller 101. The user can directly designate coordinates of an AF frame and an object, displayed on a display section 130, using the touch panel.

A zoom lens 105 includes, for example, a shutter, a diaphragm, and a focus lens (none of which are shown). The zoom lens 105 is extended when the camera 100 is shifted to a photographing mode, and is retracted when the camera 100 is powered off.

An optical image (object image) is formed on an image pickup section 110 via the zoom lens 105. At this time, focusing is performed by controlling a position of the focus lens, and light amount adjustment is performed using the diaphragm. The image pickup section 110 includes an image pickup device (not shown), such as a CCD sensor or a CMOS sensor, and generates an electric signal (analog image signal) corresponding to the optical image. Further, the image pickup section 110 converts the analog image signal to a digital image signal by analog-to-digital conversion, and then sends the digital image signal to the image processor 111.

The image processor 111 performs image quality adjustment processing for correcting white balance, and adjusting colors, brightness, and so forth, on the digital image signal according to preset values, and outputs image data thus formed. Then, the controller 101 sends the image data output from the image processor 111 to a memory 104, a video output section 150, described hereinafter, and a display controller 131.

An audio input section 120 collects sound around the camera 100 via an integrated non-directional microphone or an external microphone connected via an audio input terminal. Then, the audio input section 120 converts a signal of the collected sound to a digital audio signal by analog-to-digital conversion, and sends the digital audio signal to an audio processor 121.

The audio processor 121 performs audio processing, such as optimization processing for optimizing the level of the digital audio signal, and outputs audio data thus formed. Then, the controller 101 sends the audio data to the memory 104. The memory 104 temporarily stores the above-described image data and audio data.

The image processor 111 reads out the image data temporarily stored in the memory 104, and encodes the image data to thereby generate compressed image data. Further, the audio processor 121 reads out the audio data temporarily stored in the memory 104, and encodes the audio data to thereby generate compressed audio data. The controller 101 sends the compressed image data and the compressed audio data to a recording and reproducing section 140.

The recording and reproducing section 140 records the compressed image data, the compressed audio data, control data associated with photographing, and so forth, in a recording medium 141. In a case where the audio data is not encoded, the controller 101 sends the audio data and the compressed image data to the recording and reproducing section 140. Then, the recording and reproducing section 140 records the audio data and the compressed image data in the recording medium 141.

The recording medium 141 may be integrated in the camera 100, or may be removable from the camera 100. In any case, the recording medium 141 is only required to be capable of recording compressed image data, compressed audio data, audio data, various data, and so forth. The recording medium 141 is e.g. a hard disk, an optical disk, a magneto-optical disk, a CD-R, a DVD-R, a magnetic tape, a nonvolatile semiconductor memory, or a flash memory.

The recording and reproducing section 140 reads out (reproduces) compressed image data, compressed audio data, or audio data, which is recorded in the recording medium 141. Then, the controller 101 sends the compressed image data and the compressed audio data, read out by the recording and reproducing section 140, to the image processor 111 and the audio processor 121, respectively.

The image processor 111 temporarily stores the received compressed image data in the memory 104, and decodes the compressed image data according to a predetermined procedure. Then, the image processor 111 sends the image data obtained by decoding to the video output section 150 and the display controller 131.

Further, the audio processor 121 temporarily stores the received compressed audio data in the memory 104, and decodes the compressed audio data according to a predetermined procedure. Then, the audio processor 121 sends the audio data obtained by decoding to an audio output section 151. In a case where the audio data is recorded in the recording medium 141 in an uncompressed state, the controller 101 directly sends the audio data to the audio output section 151.

The audio output section 151 includes e.g. an audio output terminal (not shown), and outputs sound corresponding to the audio data from an earphone or a loudspeaker (not shown), which is connected to the audio output terminal. The audio output section 151 may be a loudspeaker incorporated in the camera 100, which outputs sound corresponding to audio data.

The video output section 150 includes e.g. a video output terminal (not shown), and displays video corresponding to the image data on an external display (not shown) or the like connected to the video output terminal. The audio output section 151 and the video output section 150 may be a single integrated terminal, such as a HDMI (High-Definition Multimedia Interface) (registered trademark) terminal.

The display controller 131 displays video corresponding to image data, an operation screen (menu screen) for operating the camera 100, and so forth, on the display section 130. The display section 130 is a display device, such as a liquid crystal display, an organic EL display, or an electronic paper.

An external apparatus communication section 152 includes e.g. a serial communication connector (not shown), and an external strobe or an external microphone can be connected to the serial communication connector. Further, the external apparatus communication section 152 is provided with a switch (not shown) for detecting attachment/detachment of an external device. Note that the external apparatus communication section 152 may be a USB connector or an IEEE 1394 connector, and by connecting the external apparatus communication section 152 to a personal computer or the like, image data may be sent to the personal computer. Further, the external apparatus communication section 152 may be provided with a combination of the above-mentioned connectors.

The above-described blocks are interconnected by a bus 103, and the bus 103 is a general-purpose bus for sending and receiving various data, control signals, instruction signals, and so forth.

Now, a description will be given of photographing of a still image using the camera 100.

When a user operates the power button of the operation section 102, a start instruction is sent from the operation section 102 to the controller 101. In response to the start instruction, the controller 101 controls a power supply section (not shown) to supply power to the camera 100.

When power is supplied, the controller 101 checks whether the mode changing switch of the operation section 102 is set to the photographing mode or a reproduction mode. It is assumed here that the photographing mode has been selected and set by the mode changing switch.

When the photographing mode is set, the controller 101 places the camera 100 in a photographing standby state. In the photographing standby state, the image processor 111 sends image data to the display controller 131. Upon receipt of the image data, the display controller 131 displays video corresponding to the image data on the display section 130. The user makes preparations for photographing while viewing the video displayed on the display section 130.

When the user half-presses the still image-recording button provided on the operation section 102 in the photographing standby state, the operation section 102 outputs a photographing preparation instruction signal to the controller 101. In response to the photographing preparation instruction signal, the controller 101 controls the image pickup section 110 and the image processor 111 to perform AE and AF operations.

By performing the AE and AF operations, the controller 101 calculates optimum exposure for an object and a distance to the object, moves the focus lens to a position for focusing on the object, controls the diaphragm to an aperture position corresponding to the optimum exposure, and thereby shifts the camera 100 to a photographing-ready state.

When the user fully presses the still image-recording button provided on the operation section 102 in the photographing-ready state, the operation section 102 outputs a photographing instruction signal to the controller 101. In response to the photographing instruction signal, the controller 101 controls the camera 100 in the following manner to perform still image photographing.

First, the image pickup section 110 generates an analog image signal corresponding to an optical image formed on the image pickup device via the zoom lens, and converts the analog image signal to a digital image signal by analog-to-digital conversion. Then, the image pickup section 110 sends the digital image signal to the image processor 111.

The image processor 111 performs predetermined image quality adjustment processing on the received digital image signal, and thereby generates image data. Then, the controller 101 sends the image data obtained by the image processor 111 to the memory 104, the video output section 150, and the display controller 131.

This enables the user to confirm the still image obtained through photographing by viewing the image displayed on the display section 130.

Then, the image processor 111 reads out the image data temporarily stored in the memory 104, and performs predetermined encoding processing on the read image data to thereby generate compressed image data. Then, the image processor 111 outputs the compressed image data to the recording and reproducing section 140. The recording and reproducing section 140 writes the compressed image data in the recording medium 141 as a still image file according to a file system, such as UDF or FAT.

When encoding processing performed by the image processor 111 is finished, the controller 101 places the camera 100 in the photographing standby state.

Next, a description will be given of photographing of a moving image using the camera 100.

When the user operates the moving image-recording start button provided on the operation section 102 in the photographing standby state, the operation section 102 sends a moving image photographing start instruction signal to the controller 101. In response to the moving image photographing start instruction signal, the controller 101 controls the camera 100 in the following manner to perform moving image photographing.

The image pickup section 110 generates an analog image signal corresponding to an optical image formed on the image pickup device via the zoom lens 105. Then, the image pickup section 110 converts the analog image signal to a digital image signal by analog-to-digital conversion, and sends the digital image signal to the image processor 111.

The image processor 111 performs predetermined image quality adjustment processing on the received digital image signal to thereby generate image data. Then, the controller 101 sends the image data obtained by the image processor 111 to the memory 104, the video output section 150, and the display controller 131. The display controller 131 displays video corresponding to the image data on the display section 130.

On the other hand, the audio input section 120 converts an analog audio signal obtained via the microphone to a digital audio signal, and sends the digital audio signal to the audio processor 121. The audio processor 121 performs optimization processing for optimizing the level of the digital audio signal, and outputs audio data thus formed. The controller 101 sends the audio data to the memory 104.

The image processor 111 reads out the image data temporarily stored in the memory 104, and performs predetermined encoding processing on the image data to thereby generate compressed image data. Further, the audio processor 121 reads out the audio data temporarily stored in the memory 104, and performs predetermined encoding processing on the audio data to thereby generate compressed audio data.

The controller 101 combines the compressed image data and the compressed audio data to thereby generate a data stream. The controller 101 outputs the generated data stream to the recording and reproducing section 140. The recording and reproducing section 140 writes the data stream in the recording medium 141 as one moving image file (moving image data) according to the file system, such as UDF or FAT.

Note that in a case where audio compression processing is not performed on the audio data, the controller 101 outputs the audio data generated by the audio processor 121 to the recording and reproducing section 140 with the compressed image data. Then, the recording and reproducing section 140 writes the audio data and the compressed image data in the recording medium 141 as one moving image file according to the file system, such as UDF or FAT, as described above.

The above-described process is continuously performed during moving image photographing. The controller 101 controls the image pickup section 110, the image processor 111, and the audio processor 121 during moving image photographing according to an operation performed on the operation section 102, or according to a result of analysis on the image data generated by the image processor 111. For example, the controller 101 controls the image pickup section 110 to move the zoom lens, adjust the aperture, and perform like other operations. Further, the controller 101 controls the image processor 111 and the audio processor 121 so as to adjust the image and sound.

Further, when the user operates a zoom key provided on the operation section 102 during moving image photographing, the controller 101 causes the image pickup section 110 to operate with an optical zoom function thereof and the image processor 111 to operate with an electronic zoom function thereof. Further, the controller 101 causes the image pickup section 110 to operate with an optical vibration-proof function thereof and the image processor 111 to operate with an electronic vibration-proof function thereof.

When the user operates the moving image-recording end button provided on the operation section 102, a moving image photographing end instruction signal is sent to the controller 101. In response to the moving image photographing end instruction signal, the controller 101 controls the camera 100 in the following manner to perform processing for terminating moving image photographing.

The image processor 111 and the audio processor 121 stop transmission of the image data and the audio data to the memory 104, respectively. Then, the image processor 111 and the audio processor 121 read out the image data and the audio data remaining in the memory 104, and performs predetermined encoding processing on the image data and the audio data to thereby generate compressed image data and compressed audio data, respectively.

The controller 101 combines the compressed image data and the compressed audio data, and outputs the generated data stream to the recording and reproducing section 140. In a case where the audio data is not compressed, the controller 101 outputs the audio data generated by the audio processor 121 and the compressed image data to the recording and reproducing section 140.

The recording and reproducing section 140 writes the data stream in the recording medium 141 as one moving image file according to the file system, such as UDF or FAT. Then, when the controller 101 stops the data stream, the controller 101 controls the camera 100 in the following manner to generate thumbnail images.

First, the recording and reproducing section 140 reads out the compressed image data of the first frame of the moving image file recorded in the recording medium 141, and sends the read data to the image processor 111. The image processor 111 temporarily stores the compressed image data in the memory 104, and decodes the image data according to a predetermined procedure into image data.

Next, the image processor 111 performs predetermined encoding processing for thumbnail use on the image data to thereby generate compressed image data for thumbnail use. Then, the controller 101 outputs the compressed image data for thumbnail use to the recording and reproducing section 140. The recording and reproducing section 140 writes the compressed image data for thumbnail use in the recording medium 141 in a manner associated with the original moving image file according to the file system, such as UDF or FAT. Then, the recording and reproducing section 140 stops the recording operation.

When the recording operation is stopped, the controller 101 controls the camera 100 to shift to the photographing standby state.

Next, a description will be given of a process associated with the reproduction mode in the camera 100.

When the reproduction mode is selected and set via the operation section 102, the controller 101 shifts the camera 100 to a reproduction state, and controls the camera 100 in the following manner.

First, the recording and reproducing section 140 reads out a still image file or a moving image file, which has been recorded in the recording medium 141. In the following description, reproduction of a moving image will be described.

The controller 101 sends compressed image data and compressed audio data of the moving image file to the image processor 111 and the audio processor 121, respectively. In a case where the audio data is not compressed, the controller 101 sends the audio data directly to the audio output section 151.

The image processor 111 and the audio processor 121 temporarily store the compressed image data and the compressed audio data in the memory 104, and decode them according to respective predetermined procedures. Then, the controller 101 sends the audio data obtained as a result of decoding processing to the audio output section 151, and the image data obtained as a result of decoding processing to the video output section 150 and the display controller 131.

The display controller 131 displays video corresponding to the image data on the display section 130, and the audio output section 151 outputs sound corresponding to the audio data from the integrated loudspeaker or the earphone or loudspeaker connected to the audio output terminal.

Thus, whenever an image feeding instruction is input via the operation section 102, the controller 101 sequentially reproduces the still image file or the moving image file, which has been recorded in the recording medium 141.

Further, when a slide show start instruction is received from the operation section 102, the controller 101 performs a slide show by sequentially reproducing still image files or moving image files, which have been recorded in the recording medium 141, in the manner described above.

Further, the controller 101 is capable of transmitting a still image file or a moving image file, which has been recorded in the recording medium 141, to an external apparatus via the external apparatus communication section 152. Further, the controller 101 is capable of displaying image data received from an external apparatus on the display section 130, and recording the same in the recording medium 141.

Next, a description will be given of light emission control of a strobe light emission section 160 of the camera 100 shown in FIG. 1.

Figure 2:
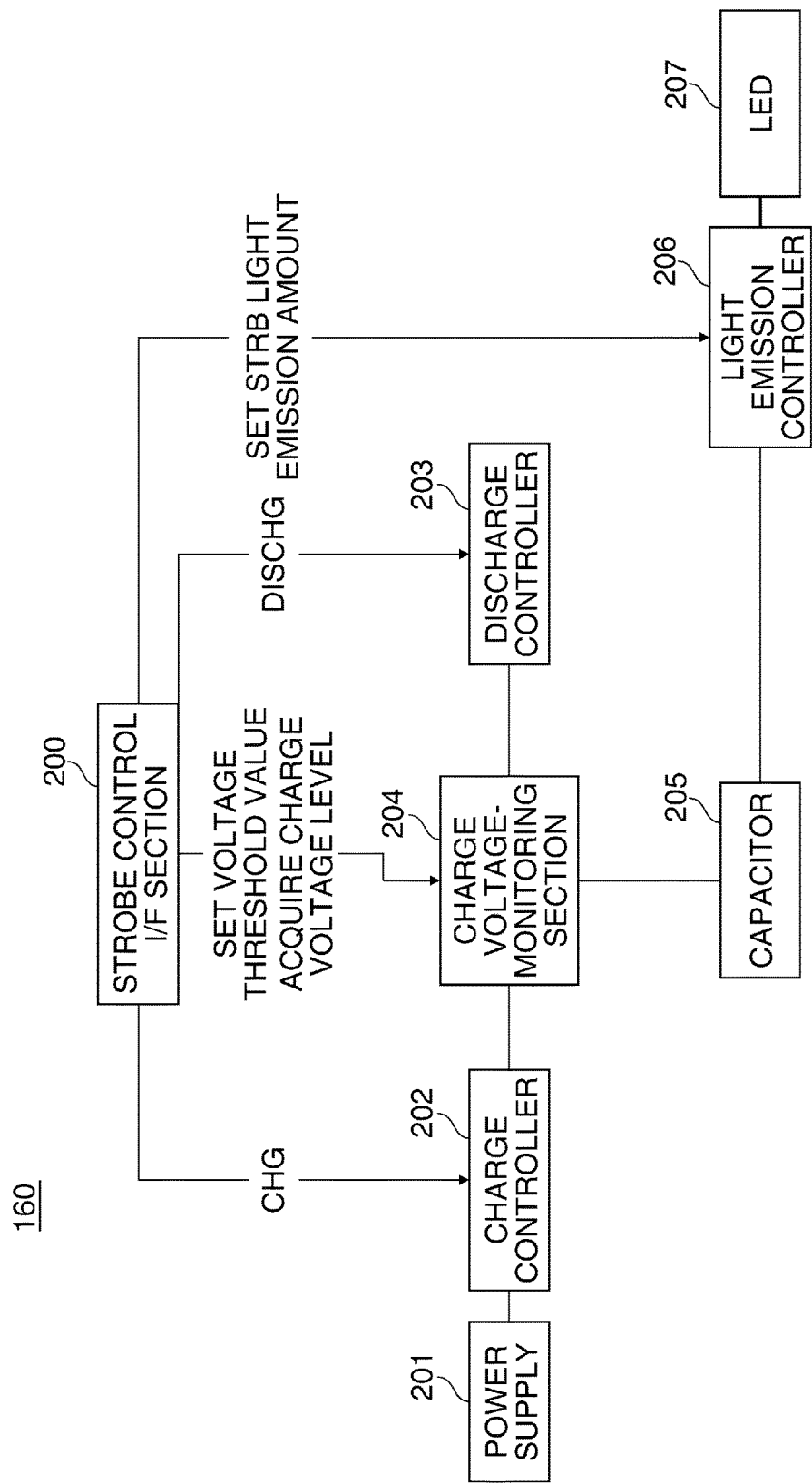
FIG. 2 is a schematic block diagram of a strobe light emission section appearing in FIG. 1.

FIG. 2 is a schematic block diagram of the strobe light emission section 160 appearing in FIG. 1.

The strobe light emission section 160 includes a strobe control interface section 200, and the strobe control interface section 200 receives a strobe control signal from the controller 101. This strobe control signal includes, for example, a charging start/stop instruction signal (CHG signal), a discharging start/stop instruction signal (DISCHG signal), and a light emission trigger signal (STRB signal). A power supply 201 supplies electric power to a capacitor (e.g. an electric double layer capacitor having electrolyte) 205 which is an accumulator unit.

A charge controller 202 controls power supplied to the capacitor 205 according to the charging start/stop instruction signal (CHG signal). A discharge controller 203 controls the discharging of electric charges accumulated in the capacitor 205 according to the discharging start/stop instruction signal (DISCHG signal).

A charge voltage-monitoring section 204 monitors the charge voltage of the capacitor 205, and controls the charging of the capacitor 205 by the charge controller 202 and the discharging of the capacitor 205 by the discharge controller 203 according to the charge voltage and a voltage threshold value set as will be described hereinafter.

For example, it is assumed that the voltage threshold value is set to T [V]. In a case where the charge control is started by the charge controller 202 in this state, when the charge voltage of the capacitor 205 becomes equal to or higher than T [V] by the charge control, the charge voltage-monitoring section 204 cuts off (stops) charging performed by the charge controller 202. When the charge voltage of the capacitor 205 becomes lower than T [V] e.g. by natural discharge in the state where charging is cut off, the charge voltage-monitoring section 204 restarts the charge control by the charge controller 202.

On the other hand, in a case where the discharge control by the discharge controller 203 is started, when the charge voltage of the capacitor 205 becomes lower than T [V], the charge voltage-monitoring section 204 cuts off (stops) discharging performed by the discharge controller 203.

The charge voltage-monitoring section 204 has the voltage threshold value dynamically set from the outside (e.g. the controller 101). That is, the charge voltage-monitoring section 204 receives the setting of the voltage threshold value from the controller 101 via the strobe control interface section 200. Note that the controller 101 sends a charge voltage level indicative of the charge voltage of the capacitor 205 to the charge voltage-monitoring section 204.

The voltage threshold value is changed according to the use, such as flash light emission for a still image, AF auxiliary light emission, and moving image video light. Here, the voltage threshold value for flash light emission is represented by ThH (first threshold voltage), and the voltage threshold value for other purposes of light emission is represented by ThL (second threshold voltage). Further, the voltage threshold value of the complete discharge level is represented by Th0. Note that it is assumed here that ThH>ThL>Th0 holds.

In response to the light emission trigger (STRB signal), a light emission controller 206 causes electric current corresponding to an amount of light emission designated by the light emission trigger to flow from the capacitor 205 to an LED 207 which is a light emitter, to thereby cause the LED 207 to emit light and illuminate an object.

Next, a description will be given of charge/discharge control performed by the camera 100 as an image pickup apparatus according to the embodiment in comparison with the conventional charge/discharge control, for ease of understanding.

Figure 3:
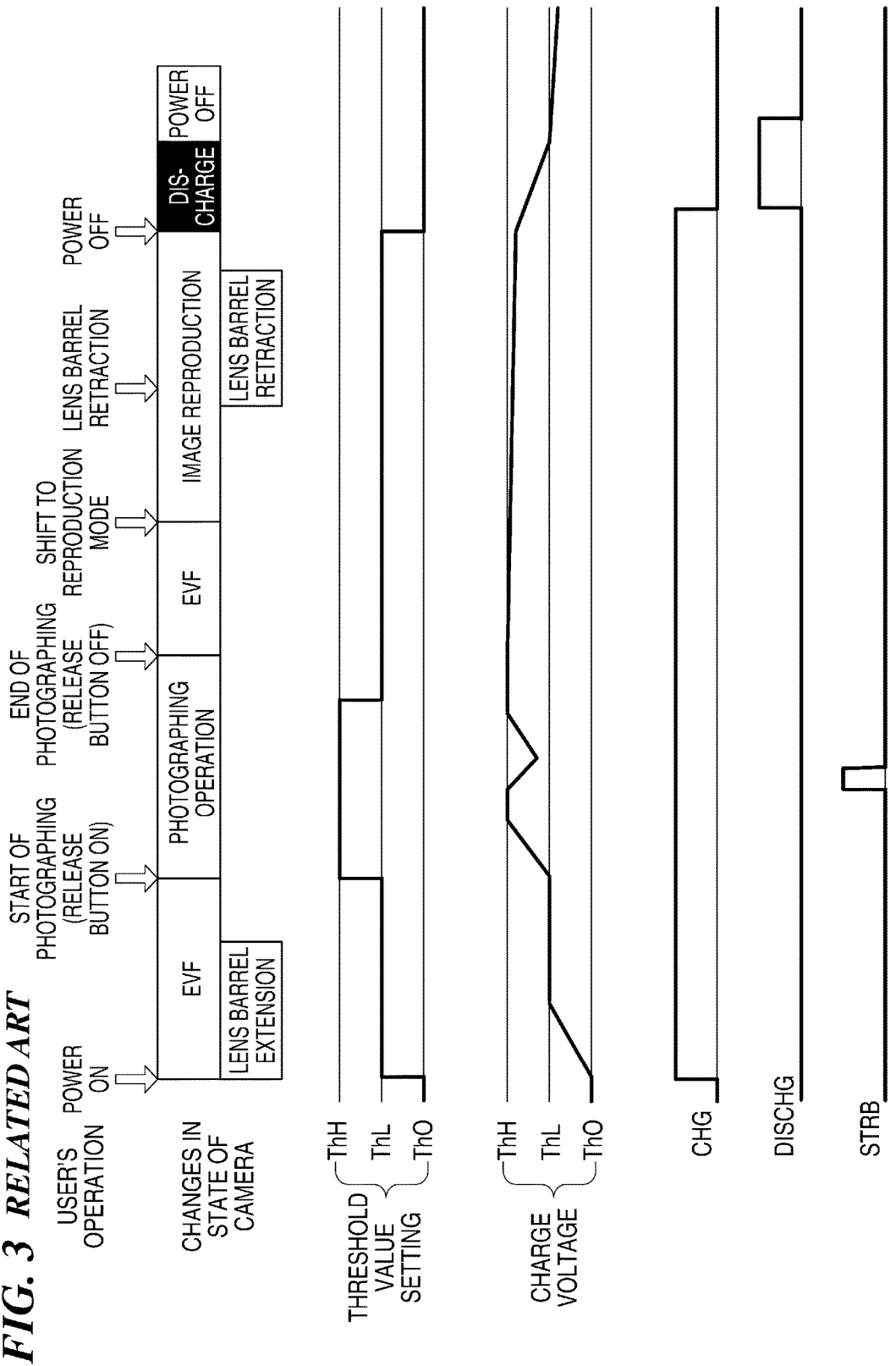
FIG. 3 is a timing diagram useful in explaining charge/discharge control performed by a conventional digital camera.

FIG. 3 is a timing diagram useful in explaining the charge/discharge control performed by the conventional camera.

Now, when an operation of the power button provided on the operation section 102 is detected, the controller 101 extends the lens barrel (i.e. the zoom lens 105 in the illustrated example in FIG. 1), and shifts the camera 100 to the photographing standby state. At this time, the controller 101 sets the voltage threshold value ThL in the charge voltage-monitoring section 204, and turns on the CHG signal to thereby cause the charge controller 202 to start charging of the capacitor 205. Then, the charge voltage-monitoring section 204 controls charging by the charge controller 202 such that the charge voltage of the capacitor 205 becomes equal to the voltage threshold value ThL.

When it is detected that the release button provided on the operation section 102 has been turned on in the photographing standby state, the controller 101 changes the voltage threshold value from ThL to ThH (ThL<ThH). Then, the controller 101 shifts the strobe light emission section 160 to a flash light emission-enabled state. Then, until the release button is turned off, the controller 101 holds the voltage threshold value at ThH to cause the strobe light emission section 160 to continue to be in the flash light emission-enabled state.

When the release button is turned off, the controller 101 changes the voltage threshold value from ThH to ThL so as to prevent the capacitor 205 from being held in a state where the charge voltage is high for a long time period. However, here, the photographing mode (photographing operation) is continued and hence the discharge control is not performed. That is, if the discharge control is performed here, the charging time required to charge the capacitor 205 when the release operation is performed again becomes longer. Further, the charged power is wastefully consumed, which degrades the photographing operation performance.

On the other hand, when the lifetime of the capacitor 205 is considered, it is desirable to make the charge voltage equal to the voltage threshold value ThL when the camera 100 is powered off. Therefore, when the power-off operation is performed by the operation section 102, the camera 100 is powered off after electric charges are discharged until the charge voltage of the capacitor 205 is lowered to the voltage threshold value ThL. As a result, the time required to power off the camera 100 becomes longer.

Incidentally, in a mode other than the photographing mode, such as the reproduction mode, for lens barrel protection purpose, the lens barrel (zoom lens) can be placed in the retracted state by a user's operation. Further, a lens retraction waiting time period, which is a time period caused to wait until the lens barrel is retracted after the mode is changed to the reproduction mode, can be set by the user.

FIG. 4 is a timing diagram useful in explaining the charge/discharge control performed by the camera 100 shown in FIG. 1.

Here, as described with reference to FIG. 3, the control is performed for operations from extension of the lens barrel in response to an operation of the power button to photographing performed in response to an operation of the release button.

When a lens retraction instruction is provided by the operation section 102, or when the lens retraction waiting time elapses after the mode is changed to the reproduction mode, the controller 101 starts the operation for retracting the zoom lens 105. At this time, the controller 101 turns off the CHG signal to thereby stop the charge control by the charge controller 202. Further, the controller 101 turns on the DISCHG signal to thereby start the discharge control by the discharge controller 203.

When the charge voltage of the capacitor 205 becomes equal to the voltage threshold ThL to complete the discharge, the controller 101 turns off the DISCHG signal and turns on the CHG signal to thereby start the charge control by the charge controller 202. Then, the controller 101 performs control using the charge voltage-monitoring section 204 such that the charge voltage of the capacitor 205 becomes equal to the voltage threshold value ThL.

After that, when the power-off operation by the operation section 102 is detected, the controller 101 immediately turns off the power. At this time, since the charge voltage of the capacitor 205 has already been lowered to the voltage threshold value ThL by taking the durability of the capacitor 205 into consideration, the controller 101 does not perform the discharge control by the discharge controller 203.

In general, when performing power-off processing of the camera 100 from the photographing state, time for the power-off processing is mostly spent in retracting the zoom lens 105. In the control shown in FIG. 4, the controller 101 lowers the charge voltage of the capacitor 205 simultaneously with the operation for retracting the zoom lens 105. Therefore, when the power-off operation is performed in a state where the zoom lens 105 has been retracted, it is possible to immediately turn off the power without generating a discharge control waiting time period required to discharge electric charges from the capacitor 205.

This makes it possible to maintain the photographing performance and the durability of the capacitor without increasing the time required to turn off the power.

Further, after the charge voltage of the capacitor 205 is lowered to the voltage threshold value ThL by the discharge control, the charge voltage of the capacitor 205 is held at the voltage threshold value ThL. Therefore, even when the camera 100 is returned to the photographing operation again, it is possible to minimize the charge waiting time required to increase the charge voltage of the capacitor 205 to the voltage threshold value ThH.

Incidentally, as described above, in the reproduction mode, normal still image reproduction (first processing), slide show reproduction for sequentially reproducing still image data and moving image data, recorded in the recording medium (second processing), moving image reproduction (third processing), and transmission and reception of images to and from an external apparatus via the external apparatus communication section (fourth processing) are selectively performed according to a user's operation.

Therefore, when a reproduction mode instruction is received from the operation section 102, the controller 101 further determines which one of the following first to fourth user's operations has been performed: The first user's operation is an image feeding operation after the reproduction mode instruction is provided, and the second user's operation is a slide show reproduction operation. Further, the third user's operation is a moving image reproduction operation, and the fourth user's operation is an operation for connection to an external apparatus via the external apparatus communication section (communication establishment).

The controller 101 performs the above-mentioned first processing to fourth processing according to the first to fourth user's operations, respectively. Then, the controller 101 turns off the CHG signal to thereby stop the charge control by the charge controller 202, and turns on the DISCHG signal to start the discharge control by the discharge controller 203.

When the charge voltage of the capacitor 205 becomes equal to the voltage threshold value ThL by the discharge of electric charges from the capacitor 205, the controller 101 turns off the DISCHG signal and turns on the CHG signal to start the charge control by the charge controller 202. Then, the controller 101 performs control using the charge voltage-monitoring section 204 such that the charge voltage of the capacitor 205 is held at the voltage threshold value ThL.

After that, when the power-off operation by the operation section 102 is detected, the controller 101 immediately turns off the power without performing the discharge control. That is, at this time, since the voltage of the capacitor 205 has already been lowered to the voltage threshold value ThL by taking the durability of the capacitor 205 into consideration, the controller 101 is not required to perform the discharge control.

When the above-mentioned first to fourth user's operations are performed, in general, the user is less likely to immediately return the camera 100 to the photographing operation. By performing the discharge control when such a user's operation as described above is performed which is low in possibility of immediately restarting the photographing operation, it is possible to immediately turn off the power without lowering the response in photographing and, what is more, without generating the discharge control waiting time.

This makes it possible to maintain the photographing performance and the durability of the capacitor without increasing the time required to turn off the power.

Further, after the charge voltage of the capacitor 205 is lowered to the voltage threshold value ThL by the discharge control, the charge voltage of the capacitor 205 is held at the voltage threshold value ThL, and hence even when the camera 100 is returned to the photographing operation again, it is possible to minimize the charge waiting time required to increase the charge voltage of the capacitor 205 to the voltage threshold value ThH.

The camera 100 shown in FIG. 1 is provided with a power saving mode for reducing power consumed by the camera 100 e.g. by limiting or cutting off power supplied to the display section 130 and the image pickup section 110 in the photographing mode.

For example, when the user sets the power saving mode using the operation section 102, the controller 101 shifts the camera 100 to the power saving mode. Further, the controller 101 may shift the camera 100 to the power saving mode if a user's operation is not detected for a predetermined time period, and the predetermined time period may be set by the user.

In the present embodiment, when the camera 100 is shifted to the power saving mode, the controller 101 turns off the CHG signal to thereby stop the charge control by the charge controller 202. Then, the controller 101 turns on the DISCHG signal to start the discharge control by the discharge controller 203. When the charge voltage of the capacitor 205 is lowered to the voltage threshold value ThL by the discharge of electric charges from the capacitor 205, the controller 101 turns off the DISCHG signal, and turns on the CHG signal to thereby start the charge control by the charge controller 202. At this time, the controller 101 performs control using the charge voltage-monitoring section 204 such that the charge voltage of the capacitor 205 is held at the voltage threshold value ThL.

After that, when the power-off operation by the operation section 102 is detected, the controller 101 immediately turns off the power without performing the discharge control. That is, at this time, since the charge voltage of the capacitor 205 has already been lowered to the voltage threshold value ThL by taking the durability of the capacitor 205 into consideration, the controller 101 is not required to perform the discharge control.

In general, in the camera 100, in a case where power supplied to the display section 130 and the image pickup section 110 is cut off in the power saving mode, a predetermined power supply sequence is performed. When shifting the camera 100 from the photographing state to the power saving mode, time required to shift the camera 100 to the power saving mode is mostly spent in the above-mentioned power supply sequence.

Therefore, the controller 101 lowers the charge voltage of the capacitor 205 simultaneously with the power supply sequence performed when shifting the camera 100 to the power saving mode. With this operation, when the power-off operation is performed from the power saving mode, it is possible to immediately turn off the power without generating the discharge control waiting time required to discharge electric charges from the capacitor 205.

This makes it possible to maintain the photographing performance and the durability of the capacitor without increasing the time required to turn off the power.

Further, after the charge voltage of the capacitor 205 is lowered to the voltage threshold value ThL by the discharge control, the charge voltage of the capacitor 205 is held at the voltage threshold value ThL, and hence even when the camera 100 is returned to the photographing operation again, it is possible to minimize the charge waiting time required to increase the charge voltage of the capacitor 205 to the voltage threshold value ThH.

As is clear from the above description, in the case of the illustrated example shown in FIGS. 1 and 2, the light emission control device is formed by at least the strobe light emission section 160 and the controller 101. Further, the controller 101, the charge controller 202, and the charge voltage-monitoring section 204 function as a charge control unit, and the controller 101, the discharge controller 203, and the charge voltage-monitoring section 204 function as a discharge control unit.

Further, the zoom lens 105, the image pickup section 110, and the image processor 111 function as an image pickup unit. And, the operation section 102 and the controller 101 function as a setting unit. Further, the controller 101 and the recording and reproducing section 140 function as a recording unit and a reproduction unit, and the controller 101 and the external apparatus communication section 152 function as a communication unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2014-184134 filed Sep. 10, 2014, which is hereby integrated by reference herein in its entirety.

What is claimed is:

1. A light mission control device that selectively controls light emission of a light emitting section when photographing, comprising:
  a capacitor configured to accumulate electric charges so as to supply electric current to the light emitting section;
  at least one processor; and
  a memory which is coupled to the at least one processor and stores instructions which cause the at least one processor to perform operations of the following units of the light emission control device;
  a charge control unit configured to perform charge control for controlling a charge voltage of said capacitor based on a first voltage threshold value;
  a light emission control unit configured to control light emission of the light emitting section in photographing, by supplying electric current from said capacitor of which the charge voltage is controlled based on the first voltage threshold value, to the light emitting section; and
  a discharge control unit configured to control, when shifting the light emitting section to a predetermined state except the photographing, the charge voltage to a second voltage threshold value which is lower than the first voltage threshold value, by causing electric charges to be discharged from said capacitor,
  wherein in a case that the second voltage threshold is set, the charge control unit performs charge control for controlling the charge voltage of said capacitor based on the second voltage threshold value, and
  wherein when a power-off operation is performed in the predetermined state, a power is turned off without discharge controlling by the discharge control unit.

2. The light emission control device according to claim 1, wherein said capacitor is an electric double layer capacitor having electrolyte.

3. An image pickup apparatus comprising:
  a capacitor configured to accumulate electric charges so as to supply electric e to a the light emitting section,
  an image pickup device configured to obtain image data by photographing an object,
  at least one processor; and
  a memory which is coupled to the at least one processor and stores instructions which cause the at least one processor to perforin operations of the following units of the image pickup apparatus:
  a charge control unit configured to perform charge control for controlling a charge voltage of said capacitor based on first voltage threshold value,
  a light emission control unit configured to control light emission of the light emitting section in photographing, by supplying electric current from said capacitor of which the charge voltage is controlled based on the first voltage threshold value, to the light emitting section, and
  a discharge control unit configured to control, when shifting the light emitting section to a predetermined state except the photographing, the charge voltage to a second voltage threshold value which is lower than the first voltage threshold value, by causing electric charges to be discharged from said capacitor,
  wherein in a case that the second voltage threshold is set, the charge control unit performs charge control for controlling the charge voltage of said capacitor based on the second voltage threshold value, and
  wherein when a power-off operation is performed in the predetermined state, power is turned off without discharge controlling by the discharge control unit.

4. The image pickup apparatus according to claim 3, wherein said image pickup device includes a zoom lens, the at least one processor further perform operations of a control unit configured to control said zoom lens to a retracted state h powering off the image pickup apparatus, and wherein the predetermined state is the retracted state.

5. The image pickup apparatus according to claim 3, the at least one processor further perform operations of a setting unit configured to set a power saving mode for limiting power to be supplied to at least said image pickup device, and wherein the predetermined state ins a state where the image pickup apparatus is in the power saving mode.

6. The image pickup apparatus according to claim 3, the at least one processor further perform operations of a recording unit configured to record the image data in a recording medium, and a production unit configured to reproduce image data recorded in the recording medium.

7. The image pickup apparatus according to claim 6, wherein the predetermined state is a state in which a slide show is performed by sequentially reproducing recorded in the recording medium by said reproduction unit.

8. The image pickup apparatus according to claim 6, wherein the predetermined state is a state in which an image feeding operation is performed when performing the reproduction by said reproduction unit.

9. The image pickup apparatus according to claim 6, wherein the predetermined state is a state in which moving image data is reproduced by said reproduction unit.

10. The image pickup apparatus according to claim 3, the at least one processor further perform operations of a communication unit configured to transmit and receive image data to and from an external apparatus, and wherein the predetermined state is a state in which communication with the external apparatus has been established by said communication unit.

11. A method of controlling a light emission control device including a light emitting section that illuminates an object, and an accumulator unit configured to accumulate electric charges so as to supply electric current to the light emitting section, the light emission control device selectively controlling light emission of the light emitting section when photographing, the method comprising:
  performing charge control for controlling a charge voltage of the accumulator unit based on to a first voltage threshold value;

controlling light emission of the light emitting section in photographing, by supplying electric current from the accumulator unit of which the charge voltage is controlled based on the first voltage threshold value, to the light emitting section; and controlling, when shifting the light emitting section to a predetermined state except the photographing, the charge voltage to a second voltage threshold value which is lower than the first voltage threshold value, by causing electric charges to be discharged from the accumulator unit, in a case that the second voltage threshold is set, performing charge control for controlling the charge voltage of said accumulator unit based on the second voltage threshold value, and wherein when a power-off operation is performed in the predetermined state, a power is turned off without discharge controlling.

12. A non-transitory computer-readable storage medium storing a computer-executable program for executing a method of controlling a light emission control device including a light emitting section that illuminates an object, and an accumulator unit configured to accumulate electric charges so as to supply electric current to the light emitting section, the light emission control device selectively controlling light emission of the light emitting section when photographing, wherein the method comprises:

performing charge control for controlling a charge voltage of the accumulator unit based on a first voltage threshold value;

controlling light emission of the light emitting section in photographing, by supplying electric current from the accumulator unit of which the charge voltage is controlled based on the first voltage threshold value, to the light emitting section; and controlling, when shifting the light emitting section to a predetermined state except the photographing, the charge voltage to a second voltage threshold value which is lower than the first voltage threshold value, by causing electric charges to be discharged from the accumulator unit, in a case that the second voltage threshold is set, performing charge control for controlling the charge voltage of said accumulator unit based on the second voltage threshold value, and wherein when a power-off operation is performed in the predetermined state, a power is turned off without discharge controlling.

* * * * *